Patented Jan. 16, 1951

2,538,096

UNITED STATES PATENT OFFICE 2,538,096

SUBSTITUTED NONANOIC ACIDS AND PROCESS OF PREPARING SAME

Stanton A. Harris, Westfield, Andrew N. Wilson, Colonia, and Karl Folkers, Plainfield, N. J., assignors to Merck & Co., Inc., Rahway, N. J., a corporation of New Jersey No Drawing. Application December 15, 1945, Serial No. 635,425

13 Claims. (Cl. 260—404.5)

This invention is concerned generally with novel chemical compounds and processes for preparing the same; more particularly, it relates to novel compounds useful as intermediates in the synthesis of the growth-promoting factor d-desthiobiotin and stereoisomers thereof.

d-Desthiobiotin is one of the isomers of the chemical compound 7:8-ureido-nonanoic acid, having the empirical formula $C_{10}H_{18}O_3N_2$, and the structural formula:

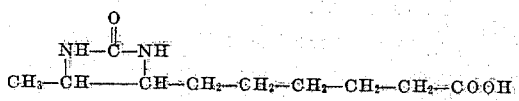

It can be prepared from biotin by hydrogenolysis with Raney nickel catalyst and has been found to possess growth-promoting activity for yeast.

It is now found that this compound can be synthesized as follows: acetoacetic ester, or an alkali derivative thereof, can be reacted in the presence of an alkali-metal alcoholate with an omega-halo-caproic ester to produce an α-acetyl suberic ester, which can be decarboxylated upon hydrolysis to give 8-ketononanoic acid. This acid, after esterification, can be reacted successively with an alkyl nitrite to produce 7-isonitroso-8-ketononanoic ester and this can then be reacted with hydroxylamine to yield 7:8-di-oximinononanoic ester from which, after reduction, is obtained 7:8-diamino nonanoic ester or acyl derivative thereof, which is then hydrolyzed and converted to the desired 7:8-ureido nonanoic acid by reaction with phosgene. These reactions can be indicated as follows:

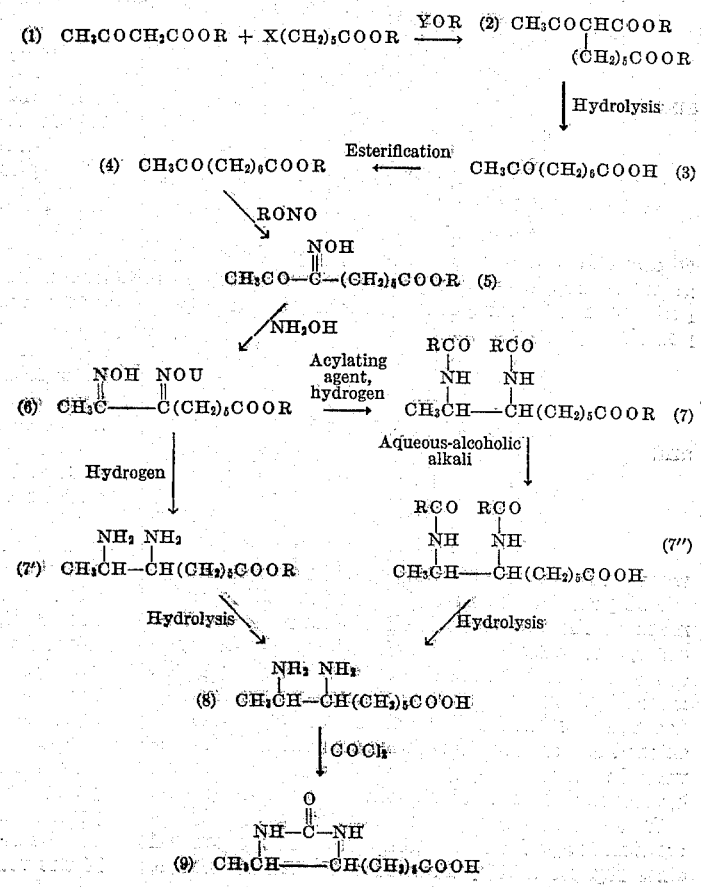

This invention is concerned with intermediates (7), (7'), and (7") above, esters and acylated derivatives of 7:8-diamino-nonanoic acid. 7:8-diamino-nonanoic ester has two asymmetric carbon atoms and exists as two stereoisomeric pairs of racemates which are known as dl-7:8-diamino-nonanoic ester which is the precursor of dl-desthiobiotin and dl-allo-7:8-diamino-nonanoic ester which is the precursor of dl-desthioallobiotin. A mixture of the above stereoisomeric racemates can be prepared by hydrogenating 7:8-dioximino-nonanoic ester in liquid ammonia in the presence of Raney nickel catalyst, as described in co-pending application Serial No. 509,772, filed Nov. 10, 1943, now Patent No. 2,424,311, issued July 22, 1947, and these racemic esters can be converted to the corresponding free acids by hydrolysis of the 7:8-diamino-nonanoic esters thus obtained. The hydrogenation of the 7:8-dioximino-nonanoic ester or acid can be carried out as disclosed in this application by reacting said dioximino compound with hydrogen in the presence of a mixture comprising an acyl anhydride and a catalyst such as platinum oxide or Raney nickel, to produce a mixture of the racemates of the 7:8-diacylamido-nonanoic ester or acid. Where the ester is obtained, this can be converted to the corresponding diacylamido-nonanoic acid by heating with aqueous-alcoholic alkali followed by acidification.

The present invention is primarily concerned with a method for preparing each of the stereoisomeric racemates described above in substantially pure form. This is accomplished by hydrogenolyzing a substantially pure stereoisomeric racemate selected from the group which consists of racemates of compounds having the general formulae:

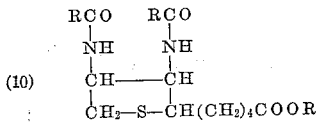

and

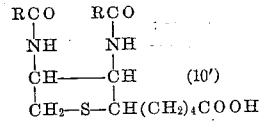

wherein R represents an alkyl, aryl or aralkyl group, in the presence of Raney nickel catalyst to produce the corresponding racemate of compounds of the formulae:

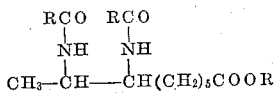

and

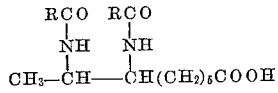

wherein R has the significance above-defined.

The product obtained, the corresponding racemate of the 7:8-(diacylamido)-nonanoic acid or ester, can be hydrolyzed by heating with an aqueous solution of an alkali metal or alkaline earth metal hydroxide; but it is presently preferred to use aqueous barium hydroxide solution. The resultant dl-7:8-diamino-nonanoic acid is then converted to the corresponding 3:4-ureido compound by treatment in alkaline solution with phosgene.

Inasmuch as the process according to this invention is applicable to compounds of the general class represented by Formulae 10 and 10' above, it will be apparent that equivalent compounds within this general class can be substituted for the specific compounds mentioned in the following examples to obtain the same reaction product. Among these equivalent starting materials are:

2-(4'-carboethoxy-butyl)-3-acetamido-4-benzamido-tetrahydrothiophene.
2-(4'-carbomethoxy-butyl)-3-acetamido-4-benzamido-tetrahydrothiophene.
2-(4'-carbobenzoxy-butyl)-3-acetamido-4-benzamido-tetrahydrothiophene.
2-(4'-carbopropoxy-butyl)-3-benzamido-4-acetamido-tetrahydrothiophene.
2-(4'-carboethoxy-butyl)-3-propamido-4-benzamido-tetrahydrothiophene.
2-(4'-carbophenoxy-butyl)-3-propamido-4-benzamido-tetrahydrothiophene, or the corresponding acids, the 2-(4'-carboxy-butyl)-3:4-diacylamido-tetrahydrothiophenes.

As described in the co-pending applications mentioned above-synthesis of 2-(4-carboxy-butyl)-3:4-(diacylamido)-tetrahydrothiophene esters yields several racemic mixtures of stereoisomers. In the case of 2-(4'-carbomethoxy-butyl)-3-acetamido-4-benzamido-tetrahydrothiophene, the isomers obtained are:

(1) The cis-isomer racemate (M. P. 153–154° C.).
(2) The trans-allo-isomer racemate (M. P. 172–173° C.).
(3) The trans-epiallo-isomer racemate (M. P. 185–186° C.).

When these stereoisomeric racemic esters are saponified by heating with aqueous alcoholic alkali followed by acidification of the reaction mixture the corresponding racemic acids are obtained, namely:

(1) dl-Cis-2-(4'-carboxy-butyl)-3-acetamido-4-benzamido-tetrahydrothiophene (M. P. 232° C.)
(2) dl-Trans-allo-2-(4'-carboxy-butyl)-3-acetamido-4-benzamido-tetrahydrothiophene (M. P. 195° C.)
(3) dl-Trans-epiallo-2-(4'-carboxy-butyl)-3-acetamido-4-benzamido-tetrahydrothiophene (M. P. 190–192° C.)

When these several racemic acids are subjected to the hydrogenolysis operation, it is found that the cis-isomer racemate yields, according to this invention, dl-7-acetamido-8-benzamido-nonanoic acid (M. P. 192° C.) whereas both the trans-allo-isomer racemate and the trans-epiallo isomer racemate yield dl-allo-7-acetamido-8-benzamido-nonanoic acid (M. P. 169–170° C.). If the racemates of 2-(4'-carbomethoxy-butyl)-3-acetamido-4-benzamido-tetrahydrothiophene are hydrogenolyzed, the corresponding racemates of methyl-7-acetamido-8-benzamido-nonanoate are obtained.

The hydrogenolysis operation is carried out by treating the stereoisomeric 2-(4'-carboxy-butyl)-3-acetamido-4-benzamido-tetrahydrothiophenes with Raney nickel catalyst, said isomer being preferably dissolved or suspended in a liquid medium as for example, water, aliphatic alcohols, and the like. The hydrogenolysis of the aforementioned isomer is conveniently conducted in aqueous alkaline solution. The time required for the reaction is dependent upon the temperature employed; it is presently preferred to use a temperature of about 75–80° C., although higher temperatures may be used, or if desired, the reaction can be carried out at room temperature or below. If the reaction is carried out at about 75° C., the hydrogenolysis is substantially complete in approximately 15 minutes.

The following examples illustrate methods of carrying out the present invention, but it is to be understood that these examples are given by way of illustration and not of limitation.

*Example 1*

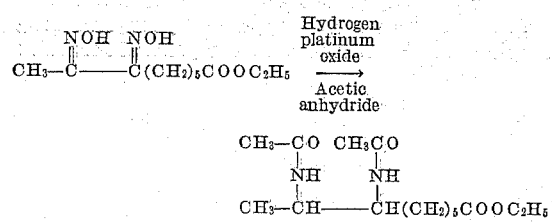

A solution of about 6 g. of ethyl-7:8-dioximino-nonanoate in about 120 cc of acetic anhydride is hydrogenated at approximately 2 atmospheres pressure using approximately 0.3 g. of Adam's platinum oxide catalyst. The rate of hydrogen absorption is such that approximately two-thirds of the theoretical amount is absorbed at the end of approximately 2 hours, at which time the catalyst is filtered off and about 0.6 g. of fresh catalyst is added. At the end of an additional hour, the theoretical amount of hydrogen is absorbed. The catalyst is then filtered off and washed several times with hot acetic acid and the solution is concentrated to dryness. The solid residue is dissolved in chloroform and allowed to stand overnight. The slightly cloudy solution is filtered and again concentrated. The precipitate which forms is filtered and washed with ether and dried to produce 7:8-diacetamido-nonanoic acid ethyl ester, (M. P. 172–173° C.); if the product is recrystallized from benzene, a jell is obtained which upon drying melts at 181–182° C.

*Example 2*

About 36.5 g. of 7:8-dioximino-nonanoic acid are dissolved in a mixture of about 700 cc. of glacial acetic acid and about 1050 cc. of acetic anhydride. This solution is reduced in an atmosphere of hydrogen at room temperature until 4 moles of hydrogen has been absorbed, using approximately 6 to 9 g. of Raney nickel catalyst. It is important to allow the reduction to go to completion; otherwise the product is of gummy consistency. The catalyst is removed and the liquor is concentrated to dryness under reduced pressure. The residue is digested with ether, allowed to stand overnight in the refrigerator, then filtered, washed with ether and dried to produce approximately 29 g. of crude 7:8-diacetamido-nonanoic acid which can be purified by triturating with ethyl acetate and then with chloroform.

*Example 3*

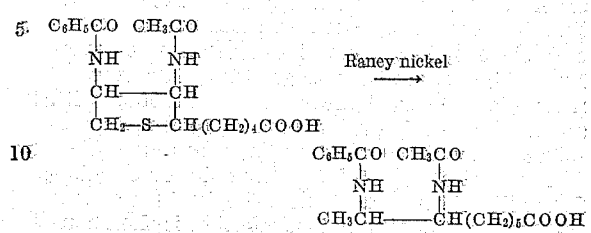

About 3.7 g. of dl-trans-allo-2-(4'-carboxy-butyl) - 3 - acetamido -4- benzamido-tetrahydrothiophene (M. P. 195° C.) is dissolved in about 1110 cc. of 0.5% sodium carbonate solution and the resulting solution is heated to approximately 75° C. and treated with about 40 g. of Raney nickel catalyst. The mixture is stirred vigorously for about 15 minutes at about 75° C., the slurry is cooled and the catalyst removed by centrifuging. The catalyst is then washed twice with 150 cc. portions of 0.5% sodium carbonate solution and once with 150 cc. of water. The combined liquors are neutralized to a pH of about 7 with sulfuric acid, after which the precipitate of aluminum oxide which forms is removed by filtration through diatomaceous silica. The clear filtrate is acidified further to a pH of about 3 and then concentrated to approximately 400 cc. volume. The product which crystallizes is filtered and washed with water and is recrystallized from boiling water to produce substantially pure dl-allo-7-acetamido-8-benzamido-nonanoic acid (M. P. 169–170° C.).

*Example 4*

The procedure of Example 3 is repeated but dl-trans-epiallo-2-(4'-carboxy-butyl)-3-acetamido-4-benzamido-tetrahydrothiophene (M. P. 192° C.) is substituted for the starting material therein indicated. After purification by crystallization from boiling water, the product melts at 169–170° C., and the mixture of this compound with that obtained from dl-trans-allo-2-(4'carboxy-butyl)-3-acetamido-4-benzamido-tetrahydrothiophene in Example 3 likewise melts at 169–170° C. The product is therefore dl-allo-7-acetamido-8-benzamido-nonanoic acid.

*Example 5*

The procedure of Example 3 is repeated but dl-cis-2-(4'-carboxy-butyl-3-acetamido-4-benzamido-tetrahydrothiophene (M. P. 230–231° C.) is substituted for the starting material therein employed. After purification, the product, dl-7-acetamido-8-benzamido-nonanoic acid melts at 192° C.

*Example 6*

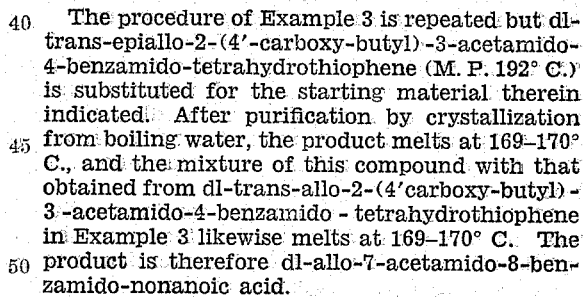

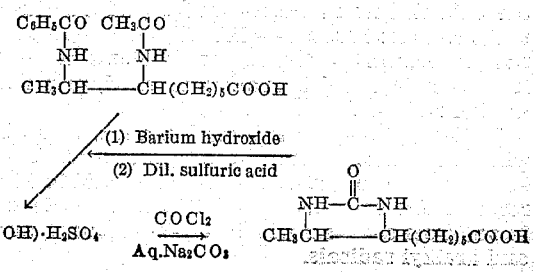

The dl-allo-7-acetamido-8-benzamido-nonanoic acid (M. P. 169–170° C.) is obtained as indicated in Examples 3 and 4 by the hydrogenolysis of either the dl-trans-allo isomer racemate or the dl-trans-epiallo isomer racemate of 2-(4'-carboxy-butyl)-3-acetamido-4-benzamido-tetrahydrothiophene; about 0.5 g. of this diacylamido-nonanoic acid is hydrolyzed by heating with about 25 g. of hydrated barium hydroxide dissolved in about 100 cc. of water for approximately 15 hours at about 140° C. The solution is acidified with sulfuric acid and the barium sulfate removed by filtration. The solution is then concentrated to dryness to obtain the dl-allo-7:8-diamino-nonanoic acid sulfate. This product is then dissolved in an aqueous solution of sodium carbonate, the solution is cooled to about 0° C. and phosgene is passed through the solution until, when tested using Congo red as an indicator, it shows an acidic reaction. On cooling and standing, racemic dl-allo-7:8-ureido-nonanoic acid crystallizes and is recovered by filtration and dried; M. P. 164° C. This product is identical with dl-desthioallobiotin prepared by hydrogenolysis of dl-allobiotin and dl-epiallobiotin using Raney nickel catalyst according to the procedure described in Example 3 above.

*Example 7*

The dl-7-acetamido-8-benzamido-nonanoic acid (M. P. 192° C.) is obtained as indicated in Example 5 by the hydrogenolysis of the dl-cis isomer racemate of 2-(4'-carboxy-butyl)-3-acetamido-4-benzamido-tetrahydrothiophene; about 0.5 g. of this diacylamido-nonanoic acid is hydrolyzed by the procedure described in Example 6 to produce dl-7:8-diamino-nonanoic acid sulfate. This product is then treated with phosgene in the manner described in Example 6 to produce dl-7:8-ureido-non-anoic acid; M. P. 165–166° C. This product is identical with the dl-desthiobiotin obtained by hydrogenolysis of dl-biotin; a mixture of this dl-desthiobiotin with the dl-desthioallobiotin obtained in Example 6 melts at about 144° C. proving that these two compounds are not the same.

Modifications may be made in carrying out the present invention without departing from the spirit and scope thereof, and the invention is to be limited only by the appended claims.

We claim:

1. Compounds having the formula:

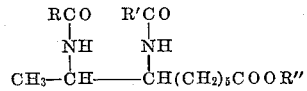

wherein R and R' are radicals selected from the class which consists of alkyl, aryl and aralkyl radicals, and R'' is a radical selected from the class which consists of hydrogen, alkyl, aryl and aralkyl radicals.

2. dl-7:8-disubstituted nonanoic acids in which the substituents in the 7- and 8-positions have the formulae: RCONH— and R'CONH— respectively, wherein R and R' are radicals selected from the class which consists of alkyl, aryl and aralkyl radicals.

3. dl-Allo-7:8-disubstituted nonanoic acids in which the substituents in the 7- and 8-positions have the formulae: RCONH— and R'CONH— respectively, wherein R and R' are radicals selected from the class which consists of alkyl, aryl and aralkyl radicals.

4. Ethyl-7:8-diacetamido-nonanoate.

5. dl-7-acetamido-8-benzamido-nonanoic acid having a melting point of about 192° C.

6. dl-Allo-7-acetamido-8-benzamido-nonanoic acid having a melting point of about 170° C.

7. A process which comprises reacting ethyl-7:8-dioximino-nonanoate with hydrogen in the presence of platinum oxide and acetic anhydride to produce ethyl-7:8-diacetamido-nonanoate.

8. A process which comprises hydrogenolyzing a compound represented by the general formula:

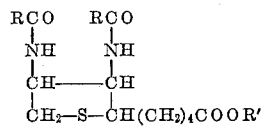

wherein R is a radical selected from the group which consists of alkyl, aryl and aralkyl radicals and R' is a radical selected from the group which consists of hydrogen, alkyl, aryl and aralkyl radicals, by reacting said compound with Raney nickel to produce a compound having the formula:

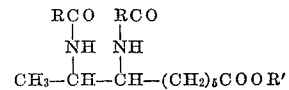

9. A process which comprises hydrogenolyzing the stereoisomeric racemate, dl-cis-2-(4'-carboxy-butyl)-3-acetamido-4-benzamido-tetrahydrothiophene, by reacting said racemate with Raney nickel to produce dl-7-acetamido-8-benzamido-nonanoic acid.

10. A process which comprises hydrogenolyzing a stereoisomeric racemate selected from the group which consists of the dl-trans-allo-isomer racemate and the dl-trans-epiallo-isomer racemate of 2-(4'-carboxy-butyl)-3-acetamido-4-benzamido-tetrahydrothiophene, by reacting said racemate with Raney nickel to produce dl-allo-7-acetamido-8-benzamido-nonanoic acid.

11. The process of preparing racemates of 7:8-ureido-nonanoic acid which comprises reacting Raney nickel with a stereoisomeric racemate having the formula:

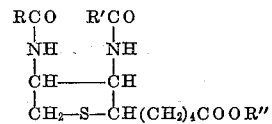

wherein R and R' are radicals selected from the class which consists of alkyl, aryl and aralkyl radicals, and R'' is a radical selected from the group which consists of hydrogen, alkyl, aryl and aralkyl radicals, hydrolyzing the compound thus produced and reacting the hydrolyzed product with phosgene.

12. The process of preparing dl-desthiobiotin which comprises reacting Raney nickel with dl-cis-2-(4'-carboxy-butyl)-3-acetamido-4-benzamido-tetrahydrothiophene, hydrolyzing the compound thus produced and reacting the hydrolyzed product with phosgene.

13. The process of preparing dl-desthio-allobiotin which comprises reacting Raney nickel with a racemate selected from the group which consists of dl-trans-allo-2-(4'-carboxybutyl)-3-acetamido-4-benzamido-tetrahydrothiophene and dl-trans-epiallo-2-(4'-carboxy-butyl)-3-acetamido-4-benzamido-tetrahydrothiophene, hydrolyzing the compound thus produced and reacting the hydrolyzed product with phosgene.

STANTON A. HARRIS.
ANDREW N. WILSON.
KARL FOLKERS.

REFERENCES CITED

The following references are of record in the file of this patent:

UNITED STATES PATENTS

| Number | Name | Date |
|---|---|---|
| 2,374,915 | Bersworth | May 1, 1945 |
| 2,400,288 | Caesar et al. | May 14, 1946 |
| 2,424,311 | Harris | July 22, 1947 |

OTHER REFERENCES

Melville et al.: J. Biol. Chem., 145 (1942), pp. 101–5.

Hofmann: Advances in Enzymology, vol. 3 (1943), pp. 294–304.

Hofmann et al.: J. Biol. Chem., July 29, 1941, pp. 205–214.

Science, November 20, 1942, vol. 96 (1942), pp. 455–61.

Vigneaud et al.: J. Biol. Chem., vol. 146 (1942), pp. 475–85.

Schmidt: Chemistry of Amino Acids and Proteins, 1938, Charles Thomas, pp. 60–64.

Shriner and Fuson: Identification of Organic Compounds, 2nd edition, 1940, Wiley, pp. 144–47.

Certificate of Correction

January 16, 1951

Patent No. 2,538,096

STANTON A. HARRIS ET AL.

It is hereby certified that error appears in the printed specification of the above numbered patent requiring correction as follows:

Columns 1 and 2, formula (6), for $$CH_3\overset{NOH}{\underset{\|}{C}}-\overset{NOU}{\underset{\|}{C}}(CH_2)_4COOR$$

read $$CH_3\overset{NOH}{\underset{\|}{C}}-\overset{NOH}{\underset{\|}{C}}(CH_2)_4COOR$$

column 4, line 22, for "2-(4-carboxy-" read *2-(4'-carboxy-*; column 8, line 30, following the second formula, insert *wherein R and R' have the significance above defined.*;

and that the said Letters Patent should be read as corrected above, so that the same may conform to the record of the case in the Patent Office.

Signed and sealed this 10th day of April, A. D. 1951.

[SEAL]

THOMAS F. MURPHY,
*Assistant Commissioner of Patents.*